Aug. 13, 1935.  W. H. GREEN  2,011,049
FLUID FLOW CONTROLLER SYSTEM
Filed June 10, 1932  2 Sheets-Sheet 1

Inventor:
Walter H Green

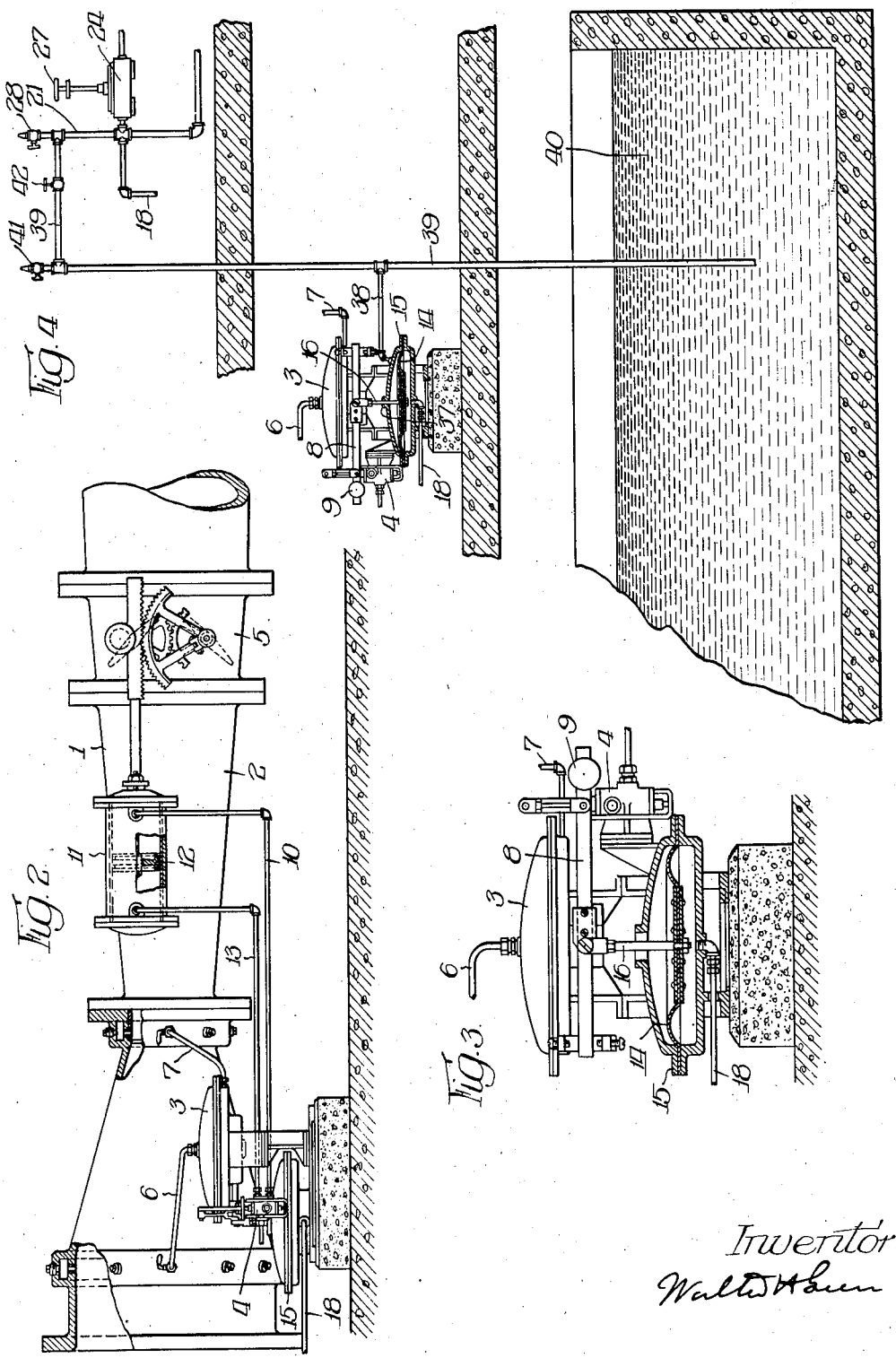

Patented Aug. 13, 1935

2,011,049

UNITED STATES PATENT OFFICE 2,011,049

FLUID FLOW CONTROLLER SYSTEM

Walter H. Green, Chicago, Ill., assignor to General Zeolite Co., Chicago, Ill., a corporation of Illinois Application June 10, 1932, Serial No. 616,440

28 Claims. (Cl. 137—152.5)

This invention relates to apparatus such as is used to control the flow of fluids through a conduit so as to govern the volume of flow at a desired rate under varying operating conditions. It has for an object to provide more simple, accurate, and effective control apparatus and a more flexible and convenient method of setting and governing such apparatus. Another object is to provide a method and means whereby the individual streams of a group of flows may be set and governed in unison from a common control or any one or more of a group may be separated from the common control and governed individually either from a common station or from separate stations. Another object is to provide for automatically governing such flows in accordance with some condition existing in the plant, as for instance the level of liquid in a receiving basin. Another object is to provide for indicating the operation at a distance or at more than one point so that supervision is facilitated. Other objects will be specifically referred to later or will become apparent upon consideration of this disclosure.

My invention has particular utility in connection with the operation of plants for the treatment or purification of water such as municipal filtration plants and for purposes of illustration will be so described.

Such a plant nearly always comprises a plurality of filter beds. In the larger plants there may be a score or more, the individual beds being usually arranged in two parallel rows with a common operating floor and a common pipe gallery between, the pipe gallery being underneath the operating floor. Associated with each filter bed and commonly mounted on a table on the operating floor adjacent to it, is a group of instruments for indicating the functioning of the filter, together with handles by which the valves controlling the several steps of the operating cycle may be opened and closed. The valves themselves and the pipes through which the various flows occur are located in the pipe gallery underneath the operating floor where they are accessible for purposes of inspection and repair but not conveniently so for observation or operation.

For the best results it is important that the rate of flow through a filter bed should not exceed a certain maximum and also that the flow be not subject to rapid fluctuations. To provide for this, the effluent line from each bed is usually equipped with a rate of flow controller that may be set to hold the flow to a rate desired.

The discharge from the several filters is commonly into a clearwell from which the water is taken for use and which serves to balance small variations in the load. Major variations such as those at different hours of the day or between day and night may be taken care of by cutting in and out units, which involves some objectionable features, or preferably by changing the rate of operation of the units by changing the setting of the controllers. In nearly all cases the setting of the rate has been by positioning a weight on a beam. In some cases it has been attempted to utilize a variable weight in fixed position, as for instance to vary the weight of water in a bucket hanging on the beam. This latter method has not proven satisfactory for various reasons, among them being such things as rusting, the tendency of the bucket to sway which causes variations, the inconvenience and care involved in adding or subtracting just the proper amount of water, errors due to the necessary vertical operating movement of the bucket, etc.

The controllers are of necessity located in the pipe gallery but since it usually is necessary to change the setting daily and perhaps several times daily, it is desirable to be able to do this from the operating floor. For this purpose mechanical connections for moving the weight have been provided but these introduce errors by reason of stiffness, lost motion, etc. It has also been attempted to use a flowing stream of water and by varying the flow to vary the weight in the bucket or the head on a diaphragm. Such methods have not proven satisfactory because due to the considerable lengths of the runs of pipe, water friction and air trapping in the pipes, the necessary movement of parts with differences or changes in elevation, errors are introduced, further errors also occurring unless the flow and waste of water is made so large as to become objectionable.

Not only is it desirable to be able to set the controllers from the operating floor, thus obviating frequent trips to the pipe gallery, but also in plants having a considerable number of units it is desirable to be able to set or rate all controllers simultaneously from a common or master setter. When this is done it is necessary to provide for the separation of any unit or units from the common control and to permit them to be set and operated individually. Furthermore, in plants subject to frequent variations in rate of use, and particularly so when the clearwell is relatively small, it is desirable that the setting of the flow controllers may be made automatically from the level in the clearwell, thus relieving the attendant from too close supervision of the rate regulation so that he may attend to his other duties, while at the same time the supply to the clearwell is maintained within limits to prevent overflow on one hand or undue drop on the other. Apparatus involving a flow or level of water such as those previously referred to have been proposed for common control but involve increased difficulties because of greater distances, etc.

By my improved method and apparatus a single controller or any one or more of a group of controllers may be rated individually, each from its station on the operating floor or from a remote common point, or simultaneously from a common master setting device located at any convenient point and such rating may be either manual or automatic or part manual and part automatic. Furthermore the setting and the controlling is free from errors due to lost motion, stiffness of connections, weight of parts and differences of elevation. The method employed and the construction utilized to secure these results will be readily understood from the following description and the appended drawings which illustrate one embodiment and application of my invention.

Briefly stated, my invention consists in part in the use of a gas, preferably air, as a means of loading the controllers or of transmitting the desired impulse thereto, whereby considerations of weight or inertia and of elevation are eliminated; in part in providing a continuous escape and supply of air whereby a condition of dynamic equilibrium is maintained; in part in utilizing a pressure of gas on a flexible diaphragm as a means of loading whereby elasticity is secured while weight and inertia are eliminated; in part in maintaining a sufficient volume in the air system so that the diaphragms may move without causing perceptible disturbance of equilibrium and in part in the novel construction, combination and arrangement of parts whereby the useful results referred to and others are obtained.

In the accompanying drawings, Fig. 1 is a view in elevation showing the controllers and operating tables of two filter units equipped with my improved system, also the master controller and air supply means.

Fig. 2 is an enlarged view of one of the controllers of Fig. 1.

Fig. 3 is an enlarged view partly in section, of the diaphragm chambers with associated parts of the controller of Fig. 2.

Fig. 4 is a view in elevation showing the diaphragm chamber of Fig. 2 with added parts to effect regulation from the water level in the clearwell.

Figure 1:
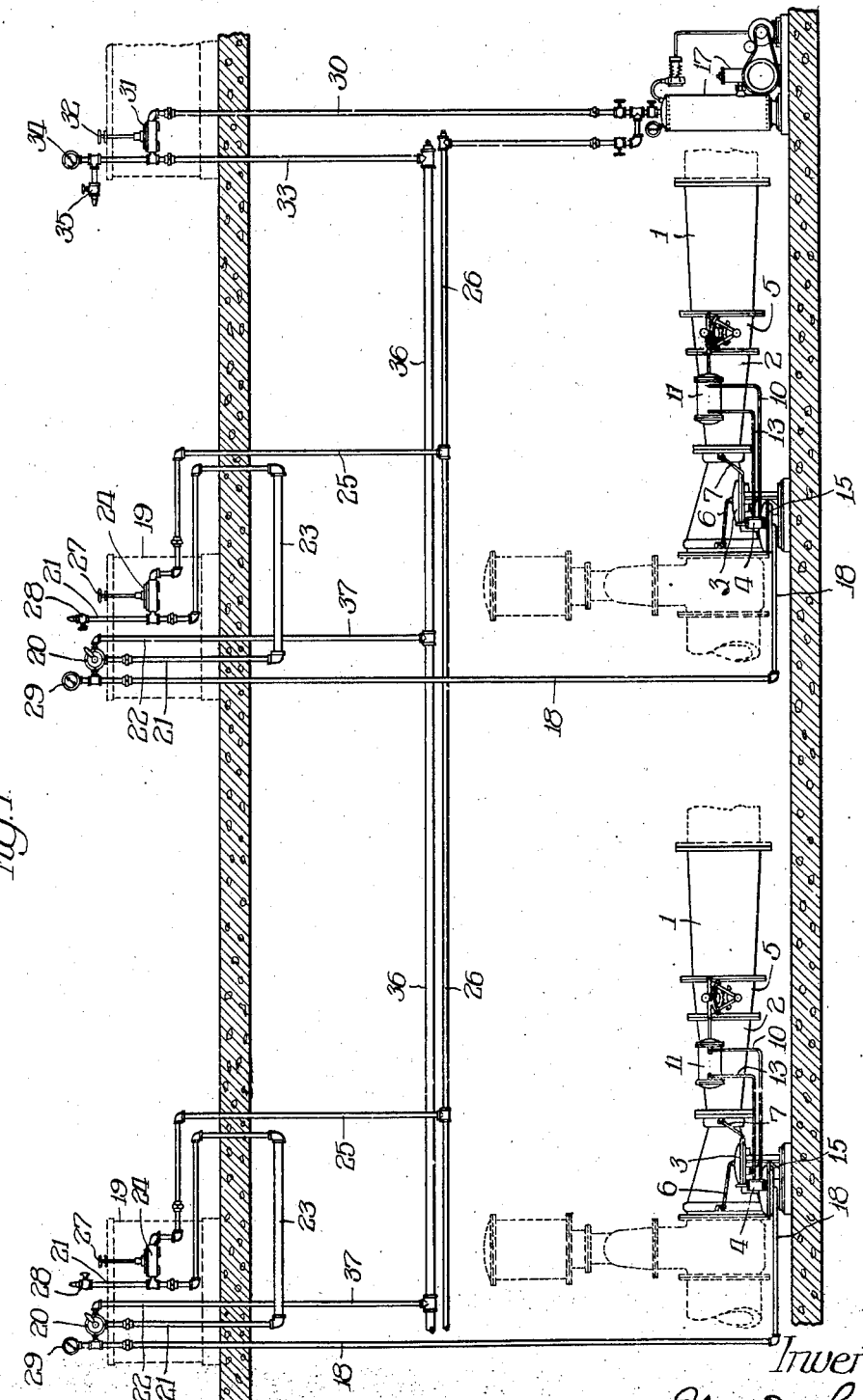

Referring now to these figures, 1 designates generally a controller of a well known type such as is commonly used in such service and which is located in the effluent line from a filter. It comprises means to obtain a differential pressure from the flow, in this case a Venturi tube 2 is shown, a diaphragm casing 3, divided into upper and lower chambers by a flexible diaphragm, a pilot valve 4 so connected as to be moved by the diaphragm and a hydraulically operated regulating valve 5 connected through the pilot valve 4 to a source of pressure water and to waste so as to be actuated to move in opening or closing direction according to the position of the pilot valve as determined by the diaphragm. The upper diaphragm chamber is connected by the lead 6 to the upstream Venturi pressure and the lower chamber by the lead 7 to the throat pressure, so that with any flow through the tube the diaphragm is subject to a downward thrust. This thrust is communicated by an arm and rock shaft to the lever 8 which through a link moves the pilot valve 4. The weight 9 serves as a counterbalance and is adjusted so that the system is in equilibrium about the rock shaft when there is no flow and the pilot valve is then in neutral.

As so far described, any flow through 2 will lower the pressure below the diaphragm causing the right arm of lever 8 to be raised and with it the pilot valve to be shifted so as to admit pressure water through pipe 10 into the right hand end of cylinder 11 moving piston 12 to the left to close valve 5, water from the left hand end of 11 escaping back to the pilot valve and so to waste through pipe 13. If now the lever 8 were extended to the right and an additional weight was provided on such extension, the lever 8 would fall, shifting the pilot valve in the opposite direction and causing water to flow into the cylinder 11 through pipe 13 and to waste through 10 and the piston would be moved to the right to open valve 5 and thus permitting flow to take place through 2. As valve 5 opened the rate of flow would increase to the point where the differential acting on the diaphragm would overcome the moment of the weight on lever 8 raising it to move the pilot valve back to neutral and thus stop further movement of valve 5. The flow is thus established at a rate such that the differential acting on the diaphragm creates a thrust equal to the moment of the weighted lever 8 and thereafter any change in the differential due to increase or decrease of flow, due say to a change of pressure, will cause shifting of the pilot valve to open or close valve 5 to restore the set flow and differential. By shifting the suppositious weight on lever 8 the moment thereof could be changed to establish different rates of flow. Controllers as just described are in common use and are subject to the limitations and involve the difficulties previously referred to. In actual practice the weights used and the moments thereof are very considerable so that questions of friction and inertia come in to cause interference with the proper correcting movements.

In my improved system I use in place of a counterweight to balance the thrust due to the differential, a second diaphragm 14 mounted in a casing 15 which it divides into two compartments. This diaphragm is connected by a rod 16 to the lever 8 in such way that upward pressure thereon creates a moment that acts counter to the downward thrust of the differential pressure on the first diaphragm. Air under pressure from a source 17 is admitted to casing 15 below diaphragm 14 through a pipe 18 as follows. Pipe 18 leads to the operating table 19 located on the operating floor above the controller where it may be connected through the 3-way cock 20 with either pipe 21 or pipe 22. Pipe 21, in which there is advantageously an enlargement 23 to serve as a reservoir, leads to a pressure reducing valve 24, the inlet of which is connected by a pipe 25 to an air header 26 which may serve any number of units. The pressure reducing or regulating valve 24 may be of any of the various well known types, but should be suitable for close regulation. It is provided with a handle 27 whereby the setting thereof may be varied. A cock 28 connected to the pipe 21, preferably between regulator 24 and cock 20, permits a continuous small bleeding of air. A gauge 29 connected to pipe 18 indicates the pressure therein.

If now the air pressure regulator 24 be set to establish a certain pressure in lines 21 and 18 and so below diaphragm 14, obviously the pilot valve 4 will be moved to operate valve 5 until the flow through 1 is at such a rate that the moment of the differential acting downward is in equilibrium with the upward moment of 14 and any change in the flow will cause a change in the differential resulting in unbalance and a correcting movement of valve 5 to reestablish equilibrium through reestablishing the set flow. The gauge 29 may be calibrated in terms of pressure but obviously and preferably, because of the relations existing, it may be made to indicate directly the rate of flow in any suitable unit as gallons per hour or per day. This is advantageous for the operator has but to glance at 29 to see what rate the controller is set for and in resetting he has but to manipulate handle 27 until the desired rate is indicated on 29.

To avoid the necessity of manipulating each controller separately in order to vary the output of the plant in accordance with demand, a master setter is provided as follows. The source of air under pressure 17 is connected by a pipe 30 with a master pressure regulator 31 which may be located at any convenient point and which may be of the same type as that previously described. This regulator is set by a handle 32 and the outlet thereof is connected by a pipe 33, provided with the gauge 34 and escape 35, with the header 36 which extends through the pipe gallery to serve as many controllers as desired. This header is connected by branches 37 to the individual 3-way cocks on the operating tables and through these may be connected to the various pipes 18 leading to the individual controllers. Thus the lower chamber of the diaphragm casings 15 may optionally be connected through the cocks 20 to either the header 26 through the pressure regulators 24 or to the header 36 of the master control. When connected to header 36 the flow controllers 1 will operate at the rate set by the regulator 31 and when connected to the header 26 each controller will operate at the rate set by its regulator 24. In either case the rate of operation is indicated by the gauges 29. Thus my system provides very simple and accurate means whereby all the members of a group of controllers may be set and governed from a common point and whereby any member or members of the group may be separated and regulated individually. Furthermore such regulation and control is free from erorrs due to distance, elevation, friction in pipes, etc. The amount of air permitted to escape through cocks 28 or 35 is very small, simply enough to prevent undue building up of pressure in lines 18 due to any leak through regulators 24 and to vent air when it is desired to reset regulators 24 to a rate involving a lower pressure.

When it is desired to provide means for governing the controller to give a flow varying according to the level in the clearwell, this may be done as follows.

Referring to Fig. 4, the upper chamber of the diaphragm casing 15 is closed and provided with a stuffing box 37 for the rod 16. This upper chamber is joined by a pipe 38 with a pipe 39, one end of which extends downwardly a desired distance into the clearwell 40. If desired, the depth of submergence of pipe 39 may be made adjustable as by a flexible section. The other end of 39 is shown joined to pipe 21, although it can ordinarily be joined to pipe 18 if more convenient. Pipe 39 is provided with a vent 41 and a valve 42 located between 41 and 21. Valve 42 is of a type, such as a needle valve, to provide close adjustment.

When it is desired to control from the depth in the clearwell, the regulator 24 is set to some maximum flow that it is desired not to exceed, cocks 28 and 41 are closed and valve 42 opened slightly to permit a flow through it corresponding to the normal escape through 28. So long as the lower end of 39 is unsubmerged, the equipment will operate at the rate set by 24, there being the usual small escape of air through 42 and 39 instead of 28. As soon, however, as the end of 39 becomes submerged, the air no longer escapes freely and pressure builds up correspondingly in 39 and thus through 38 above the diaphragm 14. As pressure so builds up above the diaphragm it opposes the pressure in the lower chamber which is that set by 24 and so has the same effect as a reduction in the setting of 24. If the level in 40 continues to rise, a point will finally be reached when the pressure on the two sides of 14 will be equalized at which point valve 5 would be entirely closed to shut off all flow through 1, thus preventing overflow of 40. In practice such a condition is unlikely since there is nearly always some withdrawal from 40 and so what normally occurs is a gradual slowing down of the flow into 40 until equilibrium between inflow and use is reached, at which point the level is maintained. Changes in rate of withdrawal from 40 will cause changes of level therein to be automatically followed by corresponding corrections in the rate of inflow.

Instead of providing the arrangement of Fig. 4 at each controller, it is obviously possible to provide the equivalents of 39, 41, and 42 in connection with the master setter 31 and run a header along the pipe gallery to which the several pipes 38 each from a separate controller, would be connected. In such case the connections of 38 should lead to or through the individual operating tables 19 and be valved so that as desired the individual controllers may be conveniently joined to or separated from such automatic master control. It is possible also to combine the two arrangements so that some members of a group of controllers may be automatically governed from the clearwell through the master setter while others are similarly but individually governed.

Obviously when the arrangement just described is used, the gauge 29 must be of the differential type and so connected as to give the differential of the pressures on the two sides of the diaphragm 14.

While to facilitate operation it is desirable to have the gauges 29 and 34 located as shown at each operating table and at the master setter, it is also desirable for purposes of supervision to be able to observe the working or setting of the various units from a common point. To do this, duplicates of the gauges 29 and 34 are mounted where desired, say in the superintendent's office, and each connected by a lead to one of the operating floor gauges. When gas pressure is used as herein proposed, there is no error caused by distance or differences in elevation and such duplicate gauges will give an accurate indication of the rating of each unit.

I propose also where it is desirable, to provide for exercising selective control over the individual units from a common point. To do this it is only necessary to provide duplicates of the pressure regulating valves 26 as well as of the gauges 29 and to assemble these on a suitable panel board located where desired. From each such duplicate pressure regulator, a lead is taken to one of the controller units. Such leads are preferably run to the tables on the operating floor and there joined to the pipes 18, a valve similar to valve 20 being provided to throw the control one way or the other. The elements 31, 34, etc. of the master setting device are preferably also mounted on any such panel. With such a mounting, a most convenient and flexible control is possible. By suitable interconnecting pipes and valves it is possible to arrange so that from this panel board any one or all of the rate of flow controllers may be separated from the control on its associated table or restored thereto and that while so separated they may be individually set and regulated at the panel or that any or all of them may be joined to the master setter to be governed thereby.

The pipes interconnecting the various chambers, gauge pressure regulators, etc., and the valves associated therewith may be arranged in many different ways. The particular arrangement used will vary more or less with each installation due to the variation in number of units, location of stations, the grouping desired to provide convenience and a neat appearance with latitude for individual preference. The manner of interconnecting is readily taken care of for any plant when the desired position of the main parts has been determined. While advantageous in a small plant having only a few filter units, the full benefits of my improvement are realized only in the larger plants where the size of the units and the number introduces the element of distance to an extent that interferes with supervision. Thus in some plants there may be as many as fifty units along a gallery several hundred feet long. Such a large plant equipped with my improved system may be as easily and as closely supervised and controlled as a small plant.

Consideration of this disclosure will suggest to those skilled in the art many changes in arrangement or modification in construction whereby my improved system may be utilized with controllers of other types than that particularly described or adapted to different conditions. Thus it may at times be advantageous to use a float such as a bell float instead of a diaphragm for the gas pressure, also the differential pressure and the gas pressure may be applied directly to operate the flow regulating valve instead of through a pilot valve. It is practical to employ a partial vacuum in some or all of the various pipes and chambers instead of a positive pressure as described and under some conditions it may be advantageous to do so. All such modifications are contemplated by me and the appended claims are to be interpreted accordingly so as to be given the broadest scope consistent with this disclosure and the prior art.

What I claim is:

1. The method of controlling the rate of liquid flow through a conduit wherein a proportionate pressure derived from said flow is operatively balanced against a pressure of gas in a manner such that a condition of unbalance effects change in the rate of liquid flow, the gas pressure being continuously governed to a predetermined value.

2. The method of regulating a flow of liquid through a conduit wherein a proportionate pressure derived from the flow is operatively balanced against a predetermined first gas pressure in such a manner that a condition of unbalance effects a change in the rate of liquid flow and altering the effect of said first gas pressure by opposing a second gas pressure thereto.

3. A method of controlling the rate of liquid flow through a conduit wherein there is derived from the flow a pressure proportional thereto, in combining said pressure with a continuously communicated predetermined gas pressure and regulating the flow from the resultant in a manner such that the flow is maintained substantially constant at a rate determined by the gas pressure.

4. The method of controlling the rate of fluid flow through a conduit which comprises deriving a proportional pressure from the flow and opposing this to a constantly maintained predetermined gas pressure and regulating the flow from the resultant in a manner to maintain the said proportional pressure substantially constant at a value corresponding to the gas pressure.

5. In a fluid system comprising a plurality of fluid flows, the method of governing the volume of said flows in unison wherein there is derived from each flow a pressure functional thereto and wherein these functional pressures are severally opposed to a common gas pressure, the said gas pressure being continuously controlled to a desired value.

6. A fluid flow system comprising a plurality of liquid flows, an individual regulator for each of said flows, a common conduit for gas connected to each of said regulators for transmitting gas pressure thereto, each regulator comprising a member whereby the effective gas pressure thereon determines the rate of liquid flow through the regulator and means for continuously governing the effective gas pressure transmitted to said regulators.

7. A fluid flow system comprising a plurality of fluid flows, an individual regulator for each of said flows, said regulators each comprising a member for determining the setting of the regulator by a gas pressure imposed thereon, a common gas conduit, a connection from said gas conduit to each regulator and a gas pressure regulator on said conduit.

8. The combination of claim 7 wherein is included a gauge adapted to indicate the flow setting of the regulators from the gas pressure transmitted thereto.

9. A fluid flow system comprising a plurality of flows and means for controlling the several flows comprising a flow regulator for each flow, a member associated with each regulator for governing same from a gas pressure applied thereto, a first gas header having a pressure regulating device thereon and adapted to serve all said regulators through leads individually joining said members and said header whereby all said regulators may be governed in common, a second gas header adapted to serve all said regulators, individual connections joining said second header to said leads, valves by which each of said leads may be selectively opened to either header and a gas pressure regulating device in said connection.

10. The system of claim 9 wherein a gauge is connected to each member whereby the gas pressure applied to each said member may be indicated.

11. A liquid flow control apparatus comprising in combination a conduit, means for obtaining a proportionate pressure from the flow therethrough, a regulating valve on said conduit, a pressure responsive member, means for communicating said proportionate pressure to said member, a source of gas under continuously maintained predetermined pressure other than atmospheric, means for communicating said gas pressure to said member, and means governed through said member for positioning said regulating valve.

12. A liquid flow control apparatus comprising in combination a conduit, means for obtaining a proportionate pressure from the flow therethrough, a regulating valve on said conduit, a constantly maintained supply of gas under pressure other than atmospheric, means for opposing said pressures and for governing the positioning of said valve from the resultant.

13. A liquid flow control apparatus comprising in combination a conduit, means for obtaining a proportionate pressure from the flow therethrough, a regulating valve on said conduit, a compound pressure responsive member, means for communicating said proportionate pressure to said member, a source of gas under pressure other than atmospheric, means to communicate said gas pressure to said member, means governed through said member for positioning said regulating valve, and means for regulating the communicated gas pressure.

14. A liquid flow control apparatus comprising in combination a conduit, means for obtaining a proportionate pressure from the flow therethrough, a regulating valve on said conduit, a compound pressure responsive member, means for communicating said proportionate pressure to said member, a source of gas under other than atmospheric pressure, means for communicating said gas pressure to said member, and means governed through said member for positioning said regulating valve, and a gauge for indicating the rate of fluid flow from the communicated gas pressure.

15. A liquid flow control apparatus comprising in combination a conduit, means for obtaining a proportionate pressure from the flow therethrough, a regulating valve on said conduit, a compound pressure responsive member, means for communicating said proportionate pressure to said member, a source of gas under pressure other than atmospheric, means to communicate said gas pressure to said member, means governed through said member for positioning said regulating valve, means for regulating the communicated gas pressure and a gas vent intermediate said pressure responsive member and said gas pressure regulator.

16. A liquid flow control apparatus comprising in combination a conduit for liquid flow, a regulating valve on said conduit, means for obtaining a proportionate pressure from the flow through said conduit, a pressure responsive member, means to communicate said proportionate pressure to said member, a source of gas under pressure other than atmospheric, a conduit for said gas joined to said member, a pressure regulating device on said conduit, a second conduit for gas joined to said member, a gas pressure regulator on said second conduit and a valve for selectively opening said member to either of said conduits.

17. An apparatus for governing fluid flow comprising in combination a conduit, a regulating valve in said conduit, means for deriving a proportionate pressure from the flow through said conduit, a pressure responsive device to which said proportionate pressure is applied, a second pressure responsive device, a source of gas under pressure other than atmospheric connected to said second device, a gas pressure regulator in said connection for regulating the pressure on said second device, said first and second devices cooperating to govern the positioning of said regulating valve so as to maintain the rate of flow through said conduit substantially constant.

18. The method of claim 2 wherein the second gas pressure is determined from some condition which is affected by the flow.

19. The method of claim 4 wherein a continual flow of gas is used to facilitate maintaining the desired gas pressure.

20. The method of controlling from a remote point the flow of liquid through a conduit that comprises operatively opposing to a differential pressure derived from the flow a continuously transmitted gas pressure that is maintained at said remote point to a valve corresponding to the desired flow.

21. The method of varying a plurality of parallel fluid flows in unison wherein a proportional pressure derived from each flow is separately and operatively opposed to a communicated common gas pressure in a manner so that the volume of each flow is determined at a point such that the proportional pressure derived from it bears a predetermined relation to the common gas pressure and altering said gas pressure to correspond with the flow desired.

22. The method of controlling a fluid flow wherein there is established a gas flow under a predetermined pressure, said gas pressure being applied to a controller for the fluid flow in such a manner that the gas pressure determines the volume of fluid flow.

23. A system comprising a plurality of conduits for parallel fluid flows, means for regulating the said flows in unison, said means comprising a controller having a pressure responsive part on each conduit, a common header for gas, said header being connected by conduits to the pressure responsive device on each controller, said pressure responsive device being adapted to govern the controller so as to permit a flow corresponding to the applied gas pressure and means for continuously transmitting through said header a controlled gas pressure.

24. The system of claim 23 wherein there is provided a gas pressure regulator on each conduit intermediate the gas header and the pressure responsive device.

25. The system of claim 23 wherein means are provided for continuously venting gas intermediate the header and the pressure responsive device.

26. The system of claim 23 wherein the gas conduit intermediate the header and the pressure responsive device is joined to a second header for gas.

27. The method of controlling the rate of fluid flow wherein a proportionate pressure is derived from said flow and said proportionate pressure is balanced against a pressure comprising a summation of interacting gas pressures and wherein any condition of unbalance between said first and said second named pressures is utilized to change the rate of fluid flow.

28. Liquid flow control apparatus comprising in combination a conduit, means for obtaining a proportionate pressure from the flow therethrough, a regulating valve on said conduit, a first pressure responsive member, means for communicating said proportionate pressure to said member, a second pressure responsive member, means to effect on said second member a summation of interacting gas pressures, said second member coacting with said first member for positioning said regulating valve.

WALTER H. GREEN.